(12) United States Patent
Harada (10) Patent No.: US 12,257,964 B2
(45) Date of Patent: Mar. 25, 2025

(54) VEHICLE BODY STRUCTURE

(71) Applicant: HONDA MOTOR CO., LTD., Tokyo (JP)

(72) Inventor: Junya Harada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 346 days.

(21) Appl. No.: 17/829,514

(22) Filed: Jun. 1, 2022

(65) Prior Publication Data

US 2022/0402449 A1    Dec. 22, 2022

(30) Foreign Application Priority Data

Jun. 18, 2021 (JP) .................................. 2021-101263

(51) Int. Cl.
*B60R 19/34* (2006.01)
*B60R 19/18* (2006.01)
*B60R 19/24* (2006.01)

(52) U.S. Cl.
CPC .............. *B60R 19/34* (2013.01); *B60R 19/18* (2013.01); *B60R 19/24* (2013.01)

(58) Field of Classification Search
CPC ......... B60R 19/24; B60R 19/18; B60R 19/34; B60R 2019/262; B60R 2019/247; B62D 21/152
USPC ................. 293/132, 133, 154, 155
See application file for complete search history.

(56) References Cited

U.S. PATENT DOCUMENTS

| | | | |
|---|---|---|---|
| 10,562,475 B2 * | 2/2020 | Fujii | ........................ B60R 19/24 |
| 11,685,325 B2 * | 6/2023 | Hamano | .................. B60R 19/34 |
| | | | 293/133 |
| 2015/0232050 A1 | 8/2015 | Yamada et al. | |
| 2016/0082911 A1 * | 3/2016 | Kaneko | ................... B60R 19/24 |
| | | | 293/133 |
| 2017/0021868 A1 | 1/2017 | Watanabe et al. | |
| 2017/0151919 A1 | 6/2017 | Kashiwagi et al. | |

(Continued)

FOREIGN PATENT DOCUMENTS

| | | |
|---|---|---|
| CN | 103347773 A | 10/2013 |
| EP | 1336536 A1 | 8/2003 |

(Continued)

OTHER PUBLICATIONS

Japanese Office Action received in corresponding Japanese application No. 2021-101263 dated Dec. 20, 2022 with English translation (10 pages).

(Continued)

*Primary Examiner* — Jason S Morrow
(74) *Attorney, Agent, or Firm* — Rankin, Hill & Clark LLP (57) ABSTRACT

A vehicle body structure includes an extension to be held between a bumper beam extending in a vehicle width direction and a side frame extending in a vehicle front-rear direction. The extension includes: a fixing plate made of a plate member and fixed to a projecting end of the side frame so as to face in the vehicle front-rear direction; a crushing body arranged on the fixing plate; and a coupling strip made of a plate member, extending along the vehicle front-rear direction, and coupling an outer end in the vehicle width direction of the fixing plate with an outer end in the vehicle width direction of the bumper beam so as to integrally continue to the fixing plate and the bumper beam.

9 Claims, 9 Drawing Sheets

(56) References Cited

U.S. PATENT DOCUMENTS

2019/0016283 A1  1/2019  Fujii et al.
2019/0168702 A1  6/2019  Fujii et al.

FOREIGN PATENT DOCUMENTS

| JP | 2007-001563 A | 1/2007 | |
| JP | 2009-248603 A | 10/2009 | |
| JP | 2013-121815 A | 6/2013 | |
| JP | 2017-024552 A | 2/2017 | |
| JP | 2017-100555 A | 6/2017 | |
| JP | 2019-018600 A | 2/2019 | |
| JP | 2019-099043 A | 6/2019 | |
| JP | 2021-088325 A | 6/2021 | |
| WO | 2015080037 A1 | 6/2015 | |
| WO | WO-2021021842 A1 * | 2/2021 | ............. B60R 19/14 |

OTHER PUBLICATIONS

Chinese Office Action received in corresponding Chinese application No. 202210643942.6 dated Jun. 28, 2024 with English translation (13 pages).

* cited by examiner

VEHICLE BODY STRUCTURE

CROSS-REFERENCE TO RELATED APPLICATION

The present application claims the benefit of priority to Japanese Patent Application No. 2021-101263 filed on Jun. 18, 2021, the disclosures of all of which are hereby incorporated by reference in their entireties.

TECHNICAL FIELD

Field of the Disclosure

The present disclosure relates to a vehicle body structure.

Related Art

Conventionally, bumper beam mounting members have been arranged at projecting ends of front side frames to mount a bumper beam on the front side frames via the bumper beam mounting members. For example, Japanese Patent Application Publication No. 2019-99043 proposes a vehicle body structure including bumper beam mounting members, each having a cylindrical bumper beam extension and a mounting plate in a plate shape, and a technique of joining a bumper beam by MIG welding to front side frames via said members.

SUMMARY OF THE DISCLOSURE

In particular, a T-shaped joint is adopted at a joint part on an outer end in a vehicle width direction, to abut on a cylindrical end of a bumper beam extension on a plate surface of a mounting plate, and join an abutted portion by MIG welding to have a T-shaped cross section. The T-shaped joint tends to have lower welding strength than a coupling joint and a fillet lap joint by MIG welding. Therefore, in order to obtain required welding strength, it is necessary to take action of such as extending a length of a welded portion and increasing a plate thickness, resulting in an increase in weight and costs. Further, it has been found that, when a load is applied to a center of a bumper beam, lateral ends of the bumper beam relatively have loads applied thereto so as to be moved forward. Then, when such loads of moving forward are applied, the T-shaped joint may be broken.

The present disclosure is intended to solve the problems described above and to provide a vehicle body structure having sufficient joint strength against a tensile load, without increase in weight and manufacturing costs.

To solve the problems described above, a vehicle body structure of the present disclosure includes an extension to be held between a bumper beam extending in a vehicle width direction and a side frame extending in a vehicle front-rear direction. The extension includes: a fixing plate made of a plate member and fixed to a projecting end of the side frame so as to face in the vehicle front-rear direction; a crushing body arranged on the fixing plate; and a coupling strip made of a plate member, extending along the vehicle front-rear direction, and coupling an outer end in the vehicle width direction of the fixing plate with an outer end in the vehicle width direction of the bumper beam so as to integrally continue to the fixing plate and the bumper beam.

The present disclosure provides a vehicle body structure with sufficient joint strength against a tensile load, without increase in weight and manufacturing costs.

DESCRIPTION OF THE EMBODIMENTS

First Embodiment

A description is given in detail of a vehicle body structure S1 of a first embodiment according to the present disclosure, with reference to FIGS. 1 to 5. Note that, in the description, the same elements are denoted by the same reference symbols, and duplicate descriptions thereof are omitted. Further, in the description below, an "outer side in a vehicle front-rear direction" refers to a direction relatively coming away from an interior, and an "interior side in the vehicle front-rear direction" refers to a direction relatively coming closer to the interior.

The vehicle body structure S1 of the present embodiment forms a front end of a vehicle (not shown) with a loading space (not shown) provided in front of the interior (not shown). Note that the interior is provided in a center of the vehicle and is a space for occupants. Further, the loading space is a space to mainly accommodate units as power source such as an engine, and is called an engine compartment.

Figure 1:
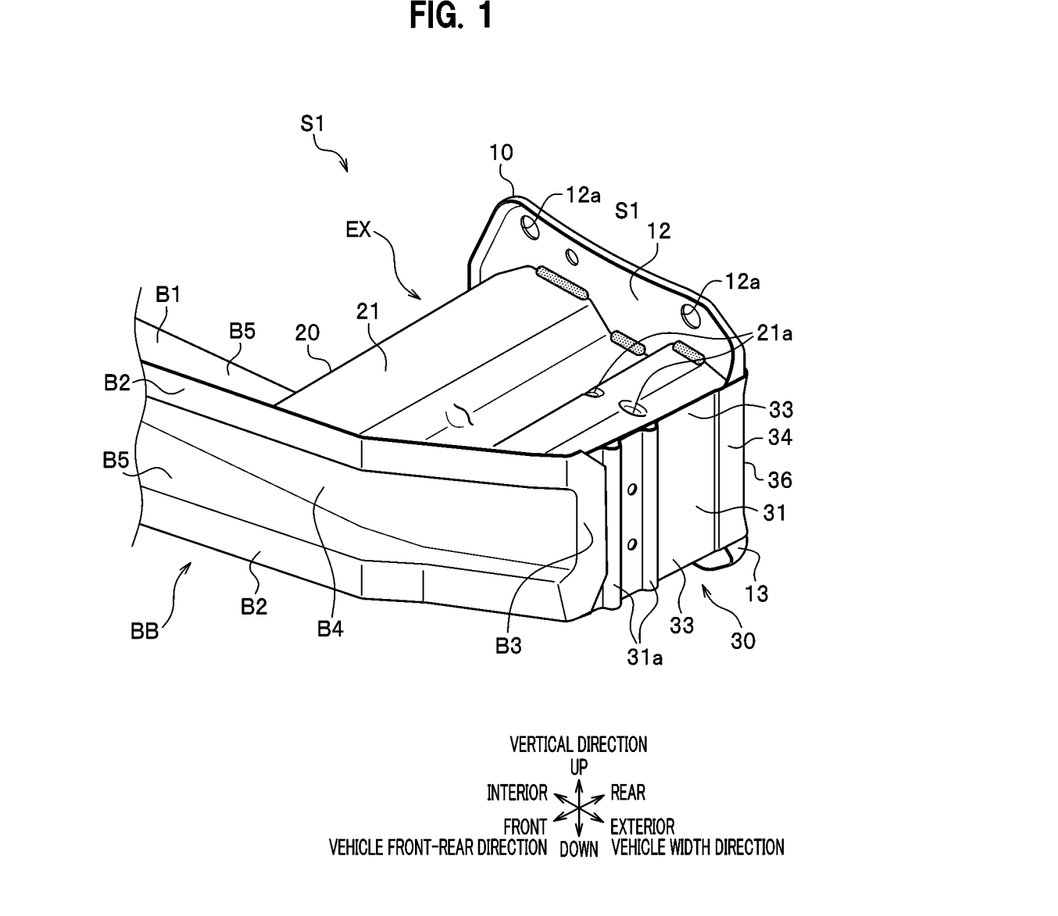
FIG. 1 is a perspective view of a vehicle body structure of a first embodiment, as viewed obliquely from upper front left.
Figure 2:
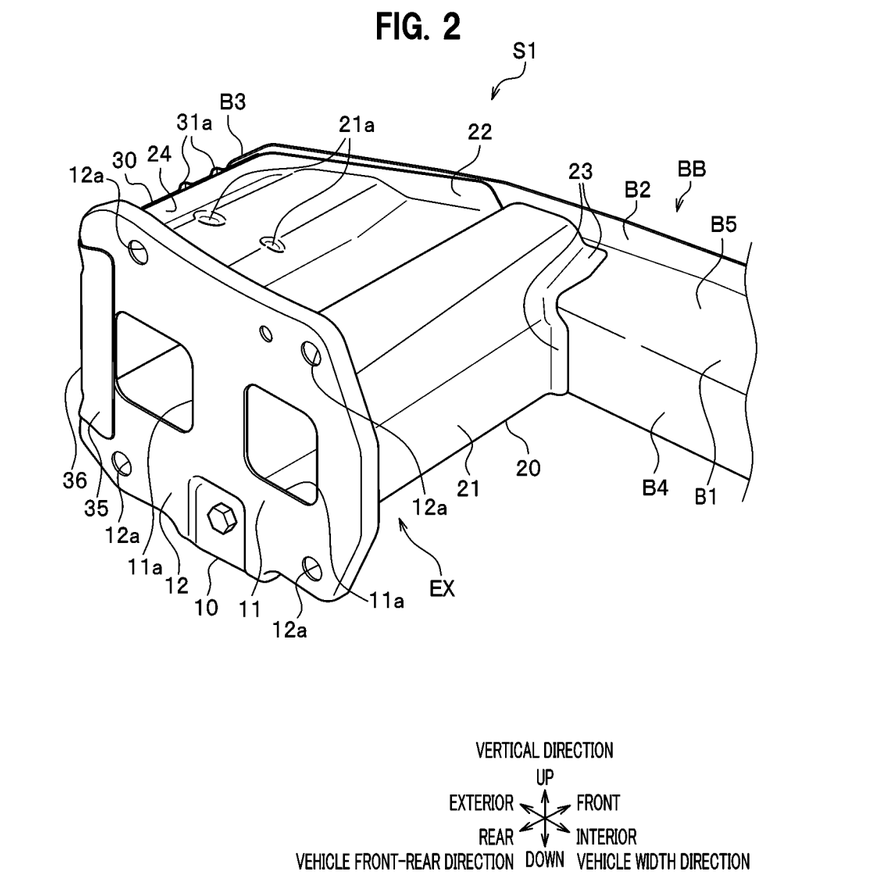
FIG. 2 is a perspective view of the vehicle body structure of the first embodiment, as viewed obliquely from upper rear right.
Figure 3:
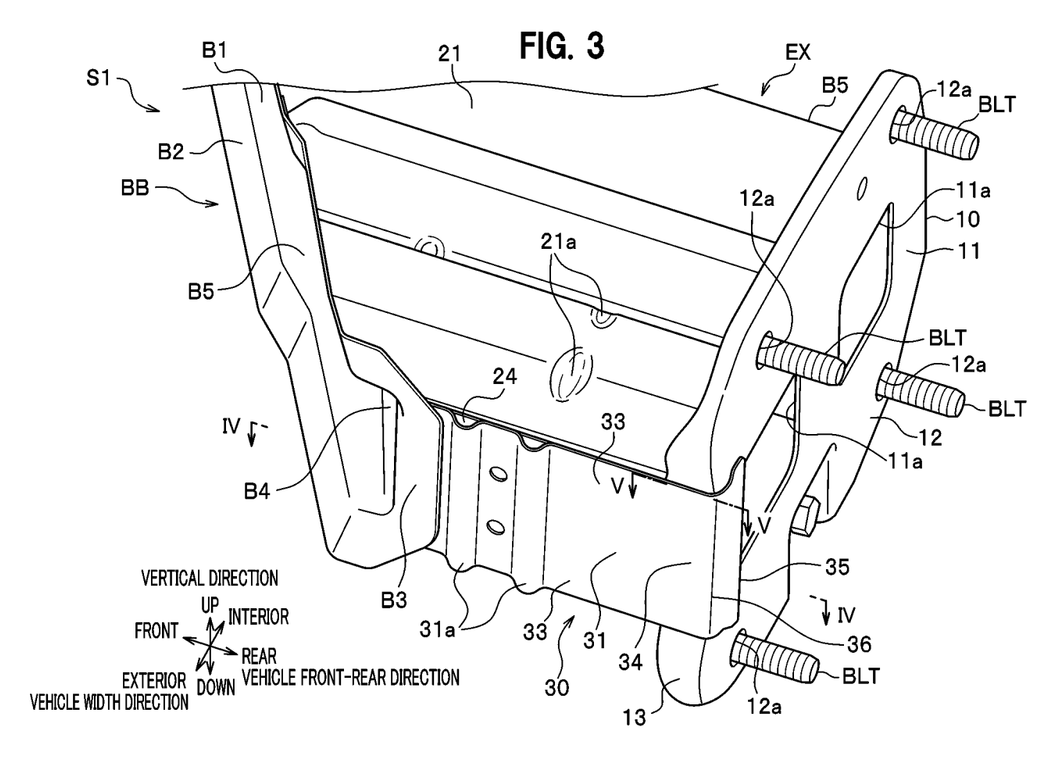
FIG. 3 is a perspective view of the vehicle body structure of the first embodiment, as viewed obliquely from upper rear left.

The vehicle body structure S1 of the present embodiment includes front side frames (not shown), a bumper beam BB, and an extension EX (See FIGS. 1 and 2). The front side frames (side frames) are arranged at both sides in the loading space and are structural materials extending along the vehicle front-rear direction, while being supported by the interior. Units such as the engine (not shown) are mounted on the front side frames.

The bumper beam BB extends along the vehicle width direction and is supported at both ends thereof by front ends, which are projecting ends, of the front side frames, via the extensions EX (see FIGS. 1 to 4). The bumper beam BB includes a beam body B1, a beam flange B2, and a beam strip joint piece B3. The beam body B1 has a rectangular groove shape and is arranged such that a rectangular groove is open frontward in the vehicle front-rear direction (outer side in the vehicle front-rear direction) while a groove bottom B4 faces rearward in the vehicle front-rear direction, and extends along the vehicle width direction.

The beam flange B2 is designed as a portion for joining the extension EX to the bumper beam BB. Further, the beam flange B2 extends from an opening edge of the groove of the beam body B1 outward the groove. Accordingly, the bumper beam BB has a substantially hat shape in cross section by a combination of the beam flange B2 and the beam body B1.

The beam strip joint piece B3 is designed as a portion for joining a coupling strip 30, to be described below, to the bumper beam BB. The beam strip joint pieces B3 extend from both ends in the vehicle width direction of the bumper beam BB rearward in the vehicle front-rear direction, so as to be flattened.

The extension EX is designed to absorb a load which is too much for a bumper (not shown) mounted to the bumper beam BB to absorb but not at a level to be absorbed by the front side frames being deformed (see FIGS. 1 to 4). Accordingly, the extension EX is provided so as to be replaceable at the projecting end of the front side frame with use of bolts BLT or the like, while being joined to the groove bottom B4 of the bumper beam BB. That is, the extension EX is held between the bumper beam BB and the front side frame.

The extension EX includes a fixing plate 10, a crushing body 20, and the coupling strip 30. The fixing plate 10 is made of a plate member and is arranged to face in the vehicle front-rear direction (see FIGS. 1 to 4). The fixing plate 10 includes a fixing body 11, a fixing flange 12, a fixing strip joint piece 13, a bent part 14, and a fixing body strip joint part 15. The fixing body 11 has a flat plate shape, and has access holes 11a formed therein so as to communicate with a cylindrical hole of the crushing body 20 to be described below. The access holes 11a are formed in a hole geometry through which an electrode used for spot welding can be inserted.

The fixing flange 12 is a portion used for assembling the extension EX to the projecting end of the front side frame (side frame). The fixing flanges 12 are formed at an upper edge and a lower edge of the fixing body 11 and each have a plurality of bolt insertion holes 12a. The fixing flange 12 is fixed to the front side frame with bolts BLT or the like, which pass through the bolt insertion holes 12a, screwed into the front end (projecting end) of the front side frame.

The fixing strip joint piece 13 is a joining portion for integrally continuing the fixing plate 10 to the coupling strip 30, which are separate members from each other. The fixing strip joint piece 13 extends forward (outward in the vehicle front-rear direction) from an outer edge in the vehicle width direction of the fixing body 11. That is, the fixing strip joint piece 13, together with the fixing body 11, forms a substantially L-shape in cross section. An amount of forward extension of the fixing strip joint piece 13 is set to one which allows for joining by spot welding.

Figure 5:
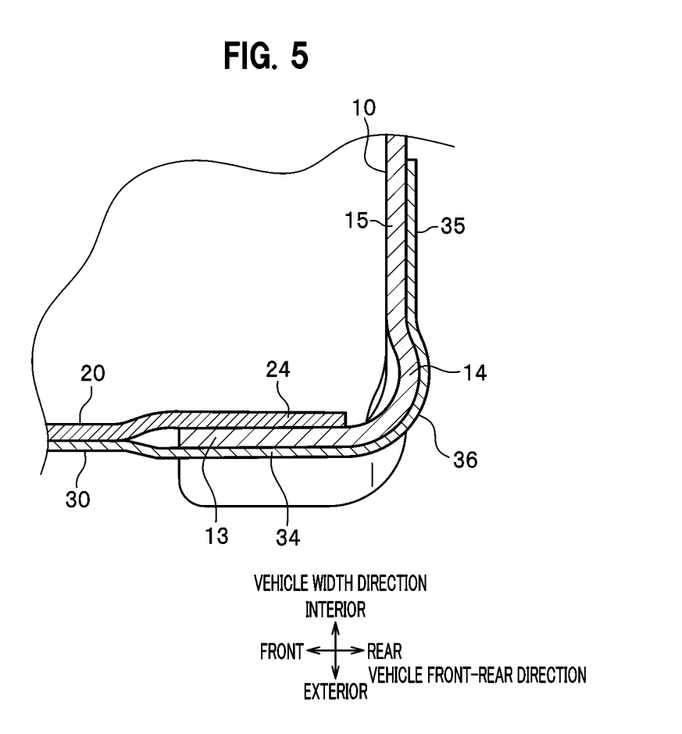
FIG. 5 is a cross-sectional view along a V-V line in FIG. 3.

The bent part 14 is a portion between the fixing body 11 and the fixing strip joint piece 13, that is, a corner of the fixing plate 10 in a substantially L-shape in cross section (FIG. 5). The bent part 14 is curved in an arc shape while bulging rearward at the corner. This defines a gap between the bent part 14 and the crushing body 20. The fixing body strip joint part 15, as a joining portion at a rear end (end, closer to the interior, in the vehicle front-rear direction) of the coupling strip 30, is formed on an opposite side (closer to the fixing body 11) of the bent part 14 to the fixing strip joint piece 13.

The crushing body 20 is designed to be crushed, when a collision load exceeding a preset value is applied to the bumper beam BB, to absorb collision energy for protecting occupants in the interior (see FIGS. 1 to 4). The crushing body 20 includes a crushing main body 21, a crushing flange joint piece 22, a crushing beam joint piece 23, and a crushing strip joint piece 24.

The crushing main body 21 is designed to have a thickness, a bent geometry, and the like so as to be crushed when a predetermined load is applied along the vehicle front-rear direction via the bumper beam BB. The crushing main body 21 is formed with a plurality of bent plate members joined with each other as a single member. Further, the crushing main body 21 is integrally joined to the coupling strip 30 to form a substantially square cylinder shape. Then, the crushing main body 21 is arranged on a front-facing plate surface of the fixing body 11 such that the cylindrical hole is open along the vehicle front-rear direction.

The crushing beam joint piece 23 is formed at a front end of the crushing main body 21, and the crushing body 20 is joined to the bumper beam BB via the crushing beam joint piece 23. A rear end of the crushing main body 21 is MIG-welded in a state of being abutted with the front-facing plate surface of the fixing body 11. That is, the crushing main body 21 is joined to the fixing plate 10 by T-joint.

Further, the crushing main body 21 is mounted on the fixing plate 10 in a state of being abutted, in the vehicle width direction, with a plate surface facing inward in the vehicle width direction of the fixing strip joint piece 13. The crushing main body 21 includes the crushing beads 21a.

The crushing beads 21a are designed as starting points of crushing, together with coupling beads 31a to be described below, when a predetermined load is applied along the vehicle front-rear direction. The crushing beads 21a are composed of irregularities formed by presswork to the crushing main body 21.

The crushing flange joint piece 22 is designed as a portion to be joined (spot-welded) to the beam flange B2 of the bumper beam BB and is formed at a front edge of the crushing main body 21. The crushing beam joint piece 23 is designed as a portion to be joined (spot-welded) to the groove bottom B4 and a groove wall B5 of the bumper beam BB. The crushing strip joint piece 24 is designed as a portion to be joined (spot-welded) to the coupling strip 30 and is formed at an outer edge in the vehicle width direction of the crushing main body 21.

The coupling strip 30 is designed as a reinforcing member to prevent the crushing main body 21 from coming off the fixing plate 10, when a load (tensile load) acting in a direction of being separated from the fixing plate 10 is applied to the bumper beam BB (see FIGS. 1 to 4). The coupling strip 30 is composed of a plate member and extends in the vehicle front-rear direction while facing in the vehicle width direction. Further, the coupling strip 30 forms an outer wall in the vehicle width direction of the extension EX, to form the cylindrical shape together with the crushing main body 21. The coupling strip 30 includes a coupling body 31, a strip beam joint piece 32, a strip crush joint piece 33, a strip fixing joint piece 34, a strip fixing body joint piece 35, and a strip bent part 36.

Figure 4:
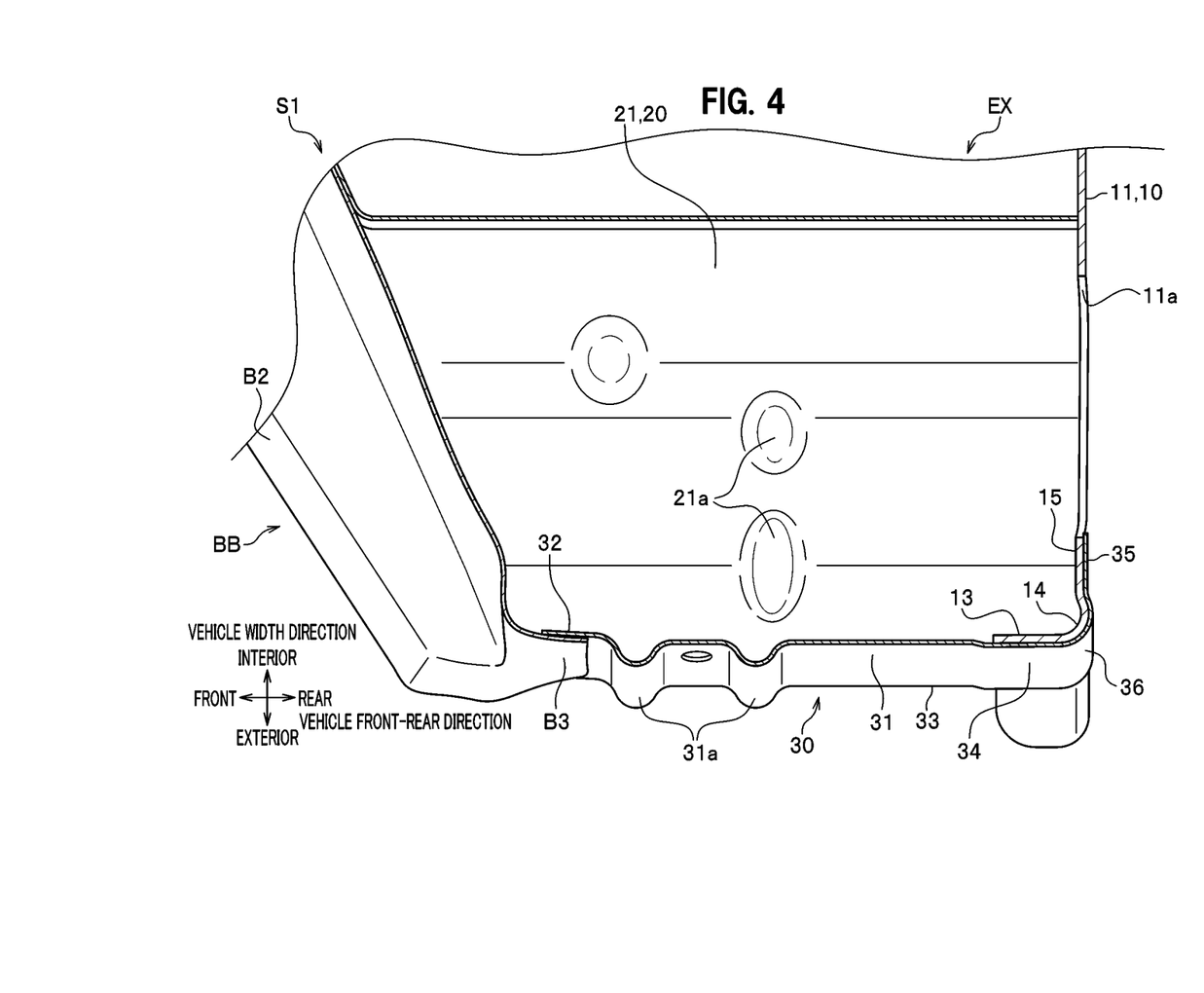
FIG. 4 is a cross-sectional view along a IV-IV line in FIG. 3.

The coupling body 31 has the coupling beads 31a and is formed in a substantially corrugated shape in planar view (see FIG. 4). The coupling beads 31a are designed as starting points of crushing, together with the above-mentioned crushing beads 21a, when a predetermined load is applied along the vehicle front-rear direction. The coupling beads 31a are formed by presswork to the coupling body 31, so as to extend along the vertical direction to have a ridged shape while protruding in the vehicle width direction.

Further, the coupling beads 31*a* are arranged so as to be aligned with the crushing beads 21*a* in the vehicle front-rear direction. That is, the coupling bead 31*a* and the crushing bead 21*a* are arranged side by side in the vehicle width direction with each other.

The strip beam joint piece 32 is designed as a portion to be joined (spot-welded) to the beam strip joint piece B3 of the bumper beam BB and is formed at the front edge of the crushing main body 21. The strip crush joint pieces 33 are each designed as a portion to be joined (spot-welded) to the crushing strip joint piece 24 of the crushing body 20 and are formed at an upper edge and a lower edge of the coupling body 31. The strip fixing joint piece 34 is designed as a portion to be joined (spot-welded) to the fixing strip joint piece 13 of the fixing plate 10. The strip fixing joint piece 34 extends rearward from a rear edge of the coupling body 31.

The strip fixing body joint piece 35 is designed as a portion to be joined (spot-welded) to the fixing body strip joint part 15 of the fixing plate 10. The strip fixing body joint piece 35 extends inward in the vehicle width direction from a rear edge of the strip fixing joint piece 34. The strip fixing body joint piece 35, together with the strip fixing joint piece 34, forms a substantially L-shape. That is, the coupling strip 30 has two joint points to the fixing plate 10.

The strip bent part 36 is designed at the corner in a substantially L-shape formed by the strip fixing body joint piece 35 and the strip fixing joint piece 34 (see FIG. 5). The strip bent part 36 is curved in an arc shape following an outer circumference surface of, and overlapped with, the bent part 14.

Next, a description is given of assembly procedures of the vehicle body structure S1. First, the strip bent part 36 of the coupling strip 30 is overlapped with, on an outer side in the vehicle width direction of, the bent part 14 of the fixing plate 10. Then, the fixing body strip joint part 15 is spot-welded with the strip fixing body joint piece 35, and the fixing strip joint piece 13 is spot-welded with the strip fixing joint piece 34.

Next, the pre-assembled crushing body 20 is arranged on the front-facing plate surface of the fixing plate 10, so as to be in contact with the coupling strip 30 from inside in the vehicle width direction. Then, the crushing strip joint piece 24 is spot-welded to the strip crush joint piece 33.

Further, MIG welding is performed such that the crushing body 20 and the front-facing plate surface of the fixing plate 10 are joined to each other by T-joint. With the preceding steps, an assembly of the extension EX is completed.

Next, the beam strip joint piece B3 of the bumper beam BB is overlapped with, on an outer side in the vehicle width direction of, the strip beam joint piece 32 of the coupling strip 30, and the groove bottom B4 is brought into contact with, at a front of, the front end of the crushing body 20. Then, the beam strip joint piece B3 is spot-welded with the strip beam joint piece 32. Further, an electrode for spot welding is inserted through the access hole 11*a* of the fixing plate 10, so that the beam flange B2 is spot-welded with the crushing beam joint piece 23. With the preceding steps, mounting the extension EX on the bumper beam BB is completed.

Next, the fixing plate 10 is overlapped with the projecting end of the front side frame and fixed with the bolts BLT. With the preceding steps, mounting the bumper beam BB and extension EX on the front side frame is completed.

Next, a description is given of advantageous effects of the present embodiment. In the vehicle body structure S1, the extension EX is arranged between the bumper beam BB and the front side frame (not shown). Then, the outer end in the vehicle width direction of the bumper beam BB and the outer end in the vehicle width direction of the fixing plate 10 of the extension EX are coupled by the coupling strip 30 so as to integrally continue to the coupling strip 30. That is, the fixing plate 10, the coupling strip 30, and the bumper beam BB are continuous as if the three were a single plate and are arranged to be bent so as to enclose therewith the crushing body 20 on an outer side in the vehicle width direction as well as on a front and rear sides of the crushing body 20.

With the structure described above, when a collision load is applied to the bumper beam BB from up ahead of the vehicle, the bumper beam BB crushes the crushing body 20 of the extension EX to absorb collision energy. Further, when a load (tensile load) acting in a direction of being separated from the fixing plate 10 (from rear to front) is applied to the bumper beam BB, the load acts on the fixing plate 10 via the coupling strip 30. This holds the joining of the crushing body 20 with the fixing plate 10 in place even when the tensile load is applied to the bumper beam BB, to prevent the crushing body 20 from coming off the fixing plate 10.

Further, in the vehicle body structure S1 of the present embodiment, the strip fixing joint piece 34 is provided at the rear end of the coupling strip 30 (closer in the vehicle front-rear direction to the interior). Then, the strip fixing body joint piece 35 provided at the rear end of the strip fixing joint piece 34 is bent inward in the vehicle width direction to have a substantially L-shape, and overlapped with, on an outer side in the vehicle width direction of, the fixing plate 10. The strip fixing body joint piece 35 is joined to the fixing body strip joint part 15 provided on the plate surface, facing rearward in the vehicle front-rear direction, (plate surface facing the interior) of the fixing plate 10.

With the structure described above, when a tensile load acts on the coupling strip 30 via the bumper beam BB, the strip fixing body joint piece 35 is caught by the bent part 14 of the fixing plate 10. Accordingly, the tensile load is dispersed, and the load acting on the strip fixing joint piece 34 can be reduced. Further, the fixing strip joint piece 13 is bent forward in the vehicle front-rear direction, and the fixing plate 10 is prevented from protruding outward in the vehicle width direction, to improve freedom of layout in the loading space.

Further, in the vehicle body structure S1 of the present embodiment, the fixing plate 10, which forms the extension EX, and the coupling strip 30 are separate members from each other and are joined by spot welding so as to be integrally continuous to each other. This allows for joining the strip fixing body joint piece 35 to the fixing body strip joint part 15, without assembly workability being reduced.

Further, in the vehicle body structure S1 of the present embodiment, the fixing strip joint piece 13, which forms the fixing plate 10, is held and joined between the crushing strip joint piece 24, which forms the crushing body 20, and the strip fixing joint piece 34, which forms the coupling strip 30. This allows for exhibiting stronger joint strength against a tensile load, without weight and manufacturing costs being increased.

Further, in the vehicle body structure S1 of the present embodiment, the corner having a substantially L-shape between the fixing body 11 and the fixing strip joint piece 13 of the fixing plate 10 is formed by the bent part 14. Then, the bent part 14 is bent to bulge rearward so as to define the gap between the bent part 14 and the crushing body 20.

The structure described above allows deformation of the bent part 14 when a tensile load acts on the coupling strip 30 via the bumper beam BB, to prevent the coupling strip 30 from being torn. Accordingly, the extension EX exhibits preset load characteristics.

Further, in the vehicle body structure S1 of the present embodiment, the access holes 11, communicating with the inside having a cylindrical shape of the crushing body 20, are formed in the fixing body 11. The structure described above allows for spot-welding the coupling strip 30 to the bumper beam BB, and spot-welding the coupling strip 30 to the fixing plate 10. Accordingly, joining can be performed without assembly workability being reduced.

Further, in the vehicle body structure S1 of the present embodiment, the coupling beads 31 are formed in the coupling strip 30, so as to extend along the vertical direction to have a ridged shape while protruding in the vehicle width direction. With the structure described above, when a collision load from up ahead of the vehicle is applied to the extension EX via the bumper beam BB, the crushing body 20 is smoothly crushed, with the coupling beads 31a working as starting points. Still further, when a tensile load acts on the extension EX via the bumper beam BB, the coupling beads 31a are stretched so that the coupling strip 30 is prevented from being torn. This allows the extension EX to exhibit preset load characteristics even when either one of a compressive load and a tensile load is applied.

Further, in the vehicle body structure S1 of the present embodiment, the crushing beads 21a protruding in the vertical direction are formed in the crushing main body 21. That is, the crushing beads 21a are formed to protrude in the cylindrical wall of the crushing body 20. Then, the coupling beads 31a are formed side by side in the vehicle width direction with the crushing beads 21a. With the structure described above, when a collision load is applied, the crushing beads 21a and the coupling beads 31a act as starting points to cause the crushing body 20 to be crushed precisely and smoothly so as to absorb the collision load.

Figure 6:
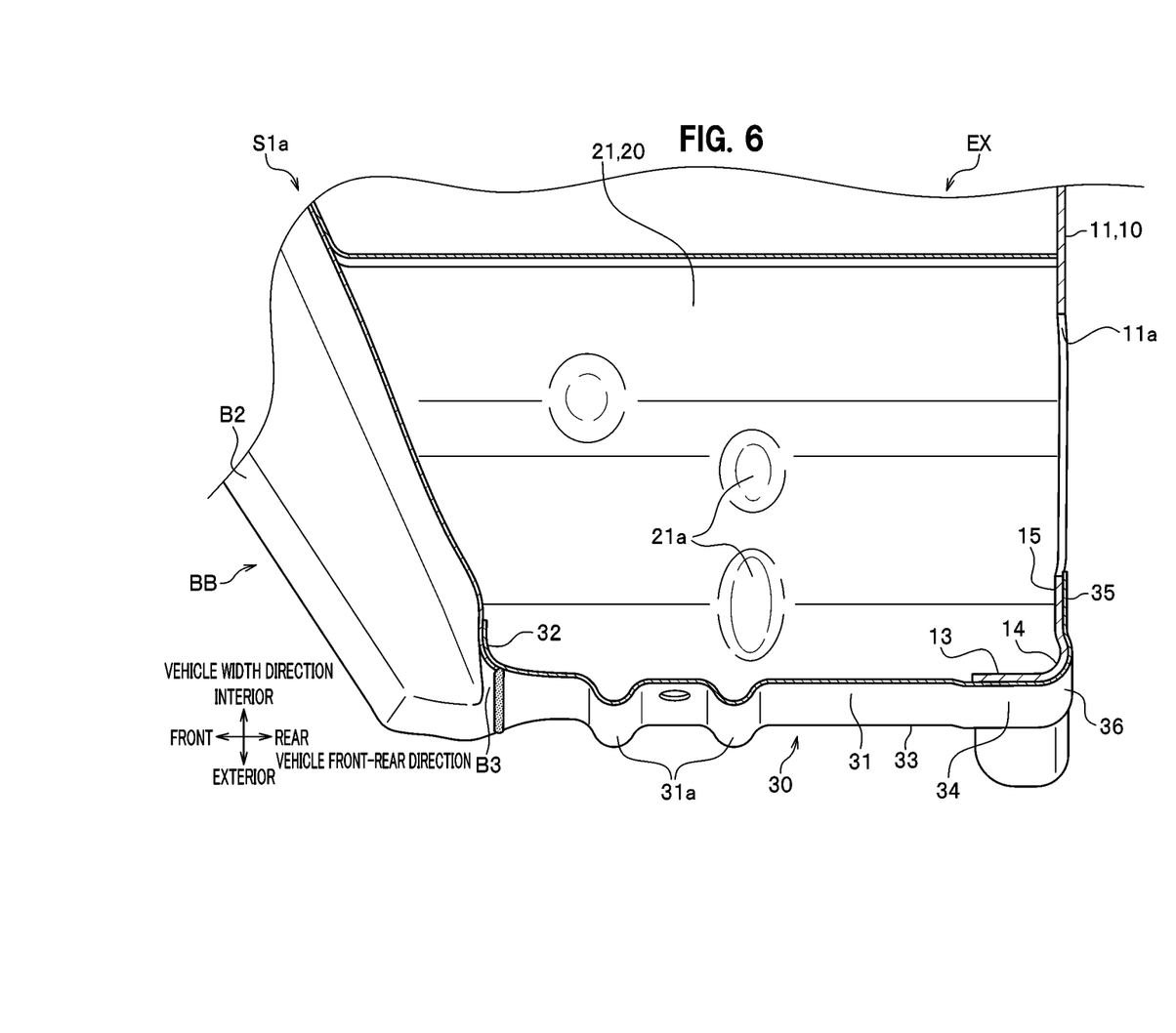
FIG. 6 is a cross-sectional view of a portion, corresponding to FIG. 3, of a modification of the first embodiment, along the IV-IV line.

Note that, in the present embodiment, spot welding is used as a joining method for joining the beam strip joint piece B3 with the strip beam joint piece 32, but the joining technique is not limited thereto. For example, as shown in FIG. 6, such a technique may be used that MIG welding is performed to the portion where the beam strip joint piece B3 is overlapped with the strip beam joint piece 32, to form a fillet lap joint. Even with the structure described above, the same advantageous effects as those of the present embodiment can be achieved.

Further, the vehicle body structure S1 of the present embodiment forms the front end of the loading space defined in front of the interior, but is not limited thereto. For example, the vehicle body structure S1 can be used for a structure at a rear end of the loading space defined behind the interior, and the same advantageous effects can be obtained as those of the present embodiment.

Second Embodiment

Figure 7:
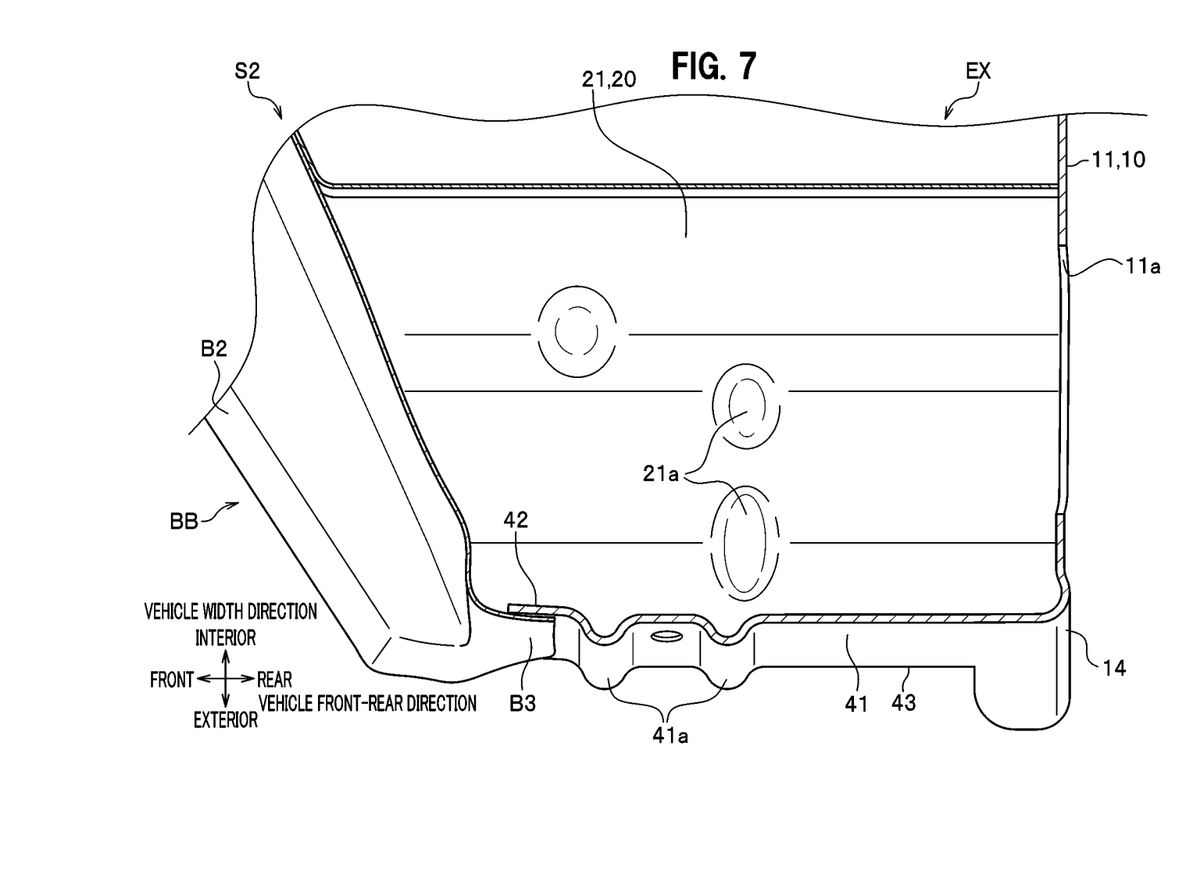
FIG. 7 is a cross-sectional view of a portion, corresponding to FIG. 3, in a vehicle body structure of a second embodiment, along the IV-IV line.

Next, a description is given of a second embodiment of the present disclosure, with reference to FIG. 7. Note that, in the description, the same elements as those of the first embodiment described above are denoted by the same symbols, and duplicate descriptions thereof are omitted. In a vehicle body structure S2 of the present embodiment, the fixing plate 10 and the coupling strip 30 have structures different from those in the vehicle body structure S1 of the first embodiment described above.

In the first embodiment described above, the fixing plate 10 and the coupling strip 30 are separate members from each other, and are joined by spot welding so as to be integrally continuous to each other. In contrast, in the present embodiment, the coupling strip is a part of the fixing plate 10, so as to be integrally continuous to the fixing plate 10. That is, the fixing plate 10 has a coupling body 41, which extends forward from an outer end in the vehicle width direction of the bent part 14, instead of the fixing strip joint piece 13.

Further, the coupling body 41 also has coupling beads 41a, a strip beam joint piece 42, and a strip crush joint piece 43 as with the respective coupling beads 31a, strip beam joint piece 32, and strip crush joint piece 33. Then, the strip beam joint piece 42 is joined to the beam strip joint piece B3, and the strip crush joint piece 43 is joined to the crushing strip joint piece 24.

The structure described above can obtain the same advantageous effects as with the first embodiment described above. Further, the coupling body 41 is configured to extend from the fixing plate 10 so that the number of parts and joining steps can be reduced.

Third Embodiment

Figure 8:
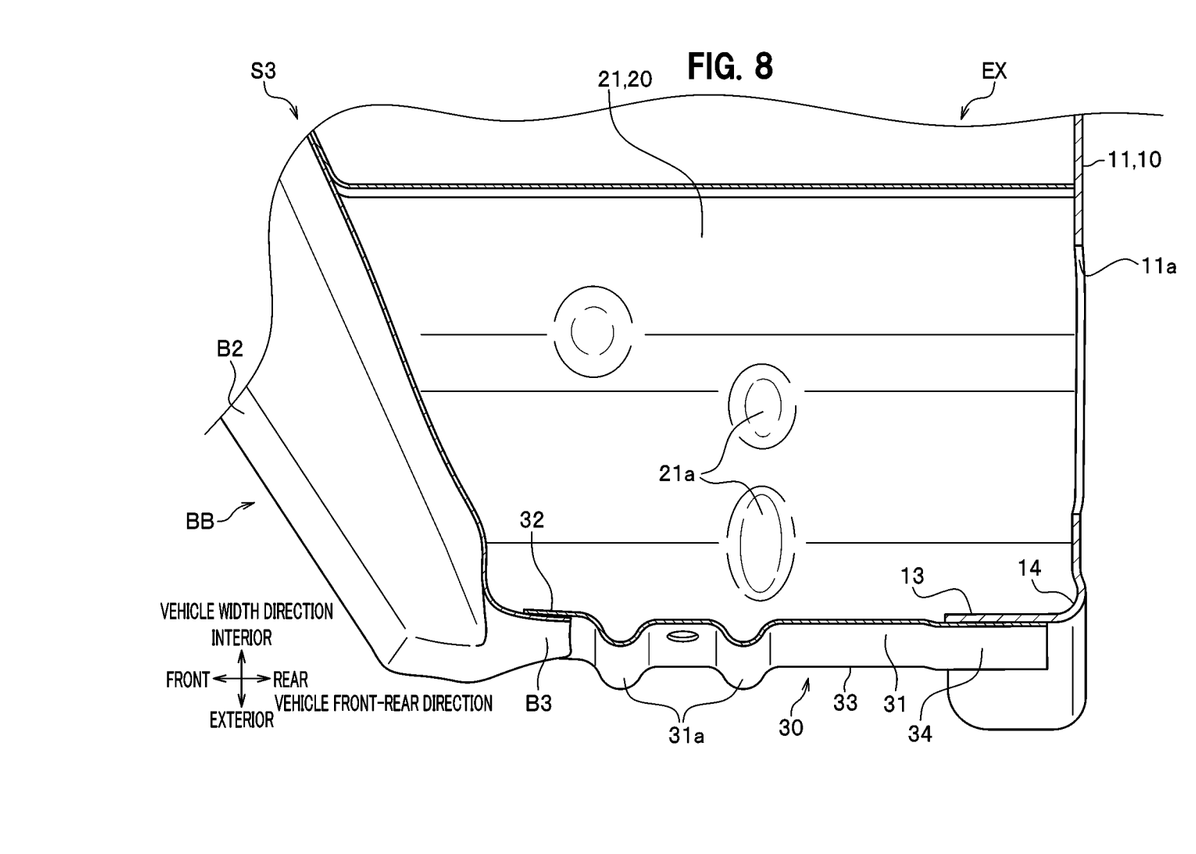
FIG. 8 is a cross-sectional view of a portion, corresponding to FIG. 3, in a vehicle body structure of a third embodiment, along the IV-IV line.

Next, a description is given of a third embodiment of the present disclosure, with reference to FIG. 8. Note that, in the description, the same elements are denoted by the same symbols as those in the first embodiment described above, and duplicate descriptions thereof are omitted. In a vehicle body structure S3 of the present embodiment, the fixing plate 10 and the coupling strip 30 have structures different from those in the vehicle body structure S1 of the first embodiment described above.

The coupling strip 30 of the first embodiment is provided with the strip fixing body joint piece 35 and the strip bent part 36, but structures corresponding to those members are not provided in the present embodiment. This causes the number of joint points, at which the fixing plate 10 is joined to the coupling strip 30, to be reduced as compared with the first embodiment, so the fixing strip joint piece 13 is extended forward in the vehicle front-rear direction. Then, with the extension of the fixing strip joint piece 13, an overlapping area of the fixing strip joint piece 13 with the strip fixing joint piece 34 is increased so that joining can be made with the same strength as that in the first embodiment. The structures described above can obtain the same advantageous effects as with the first embodiment described above.

Fourth Embodiment

Figure 9:
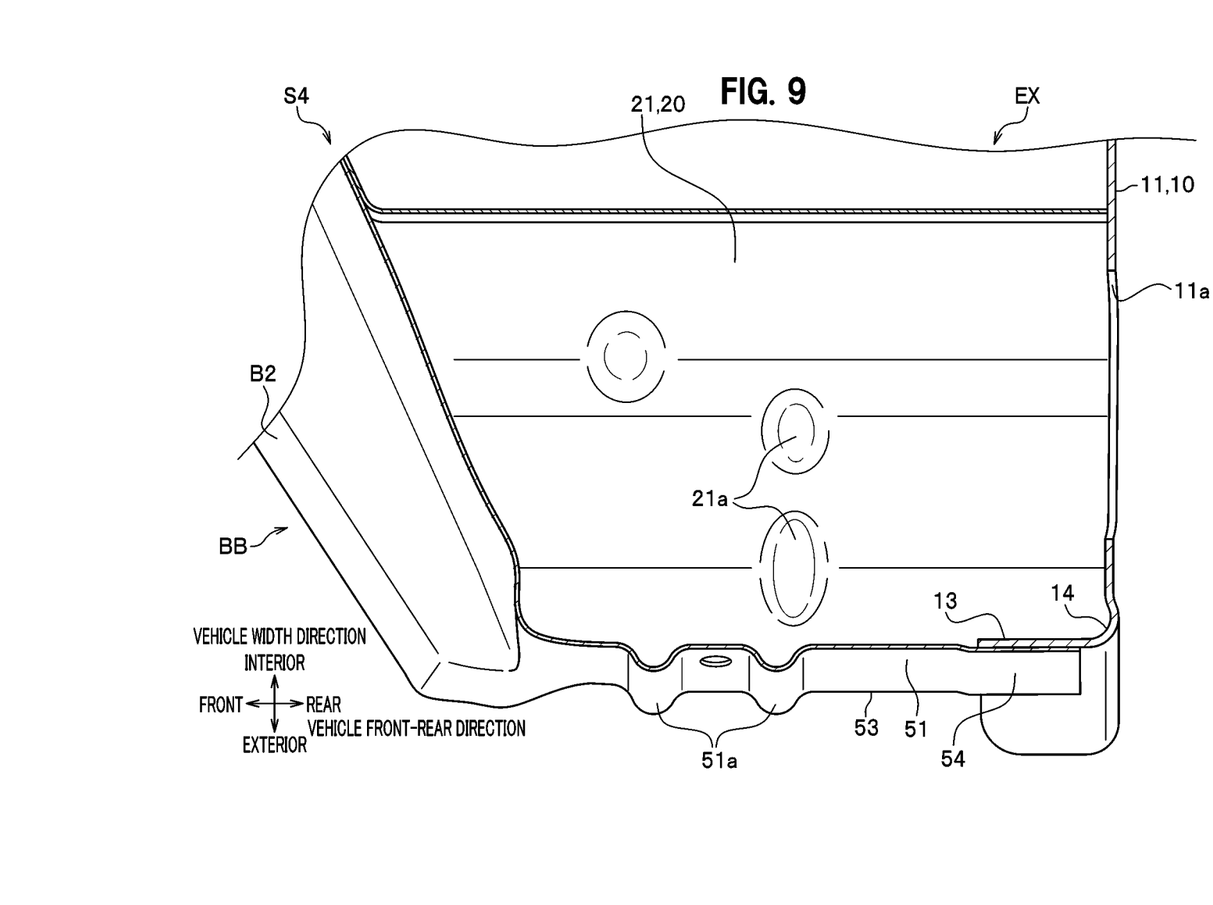
FIG. 9 is a cross-sectional view of a portion, corresponding to FIG. 3, in a vehicle body structure of a fourth embodiment, along the IV-IV line.

Next, a description is given of a fourth embodiment of the present disclosure, with reference to FIG. 9. Note that, in the description, the same elements are denoted by the same reference symbols as those in the first embodiment described above, and duplicate descriptions thereof are omitted. In a vehicle body structure S4 of the present embodiment, the fixing plate 10 and the coupling strip 30 have structures different from those in the vehicle body structure S1 of the first embodiment described above.

In the first embodiment described above, the bumper beam BB and the coupling strip 30 are separate members from each other, and are joined by spot welding so as to be integrally continuous to each other. In contrast, in the present embodiment, the coupling strip is a part of the bumper beam BB, so as to be integrally continuous. That is, the bumper beam BB has a coupling body 51, which extends rearward in the vehicle front-rear direction, instead of the fixing strip joint piece 13.

Further, the coupling body 51 also has coupling beads 51a, a strip crush joint piece 53, and a strip fixing joint piece 54 as with the respective coupling beads 31a, strip crush joint piece 33, and strip fixing joint piece 34. Then, the strip crush joint piece 53 is joined to the crushing strip joint piece 24, and the strip fixing joint piece 54 is joined to the fixing strip joint piece 13. Note that, in the present embodiment, structures corresponding to the bent part 14 and the fixing body strip joint part 15 are not provided.

This causes the number of joint points, at which the fixing plate 10 is joined to the coupling body 51, to be reduced as compared with the first embodiment, so the fixing strip joint piece 13 is extended forward in the vehicle front-rear direction. Then, with the extension of the fixing strip joint piece 13, an overlapping area of the fixing strip joint piece 13 with the strip fixing joint piece 54 is increased so that joining can be made with the same strength as that in the first embodiment. The structures described above can obtain the same advantageous effects as with the first embodiment described above. Further, the coupling body 51 is configured to extend from the bumper beam BB so that the number of parts and joining steps can be reduced.

What is claimed is:

1. A vehicle body structure comprising an extension to be held between a bumper beam extending in a vehicle width direction and a side frame extending in a vehicle front-rear direction, wherein
    the extension includes:
        a fixing plate made of a plate member and fixed to a projecting end of the side frame so as to face in the vehicle front-rear direction;
        a crushing body arranged on the fixing plate; and
        a coupling strip made of a plate member, extending along the vehicle front-rear direction, and coupling an outer end in the vehicle width direction of the fixing plate with an outer end in the vehicle width direction of the bumper beam so as to integrally continue to the fixing plate and the bumper beam,
    the coupling strip
        has a substantially L-shape, with a portion thereof closer in the vehicle front-rear direction to an interior of a vehicle bent inward in the vehicle width direction,
        is overlapped with, on an outer side in the vehicle width direction of, the fixing plate, and
        has an end thereof closer in the vehicle front-rear direction to the interior joined to a plate surface, facing the interior, of the fixing plate.

2. A vehicle body structure comprising an extension to be held between a bumper beam extending in a vehicle width direction and a side frame extending in a vehicle front-rear direction, wherein
    the extension includes:
        a fixing plate made of a plate member and fixed to a projecting end of the side frame so as to face in the vehicle front-rear direction;
        a crushing body arranged on the fixing plate; and
        a coupling strip made of a plate member, extending along the vehicle front-rear direction, and coupling an outer end in the vehicle width direction of the fixing plate with an outer end in the vehicle width direction of the bumper beam so as to integrally continue to the fixing plate and the bumper beam,
    the coupling strip and the crushing body are separate members from each other and are integrally continuous to each other by joining,
    the fixing plate includes a fixing body arranged to face in the vehicle front-rear direction, and a fixing strip joint piece extending from an outer end in the vehicle width direction of the fixing body outward in the vehicle front-rear direction, and
    the fixing strip joint piece is joined between the crushing body and the coupling strip.

3. The vehicle body structure as claimed in claim 2, wherein a corner of the fixing plate in a substantially L-shape between the fixing body and the fixing strip joint piece is bent to bulge rearward at the corner, to define a gap between the corner and the crushing body.

4. The vehicle body structure as claimed in claim 1, wherein the fixing plate has an access hole communicating with an inside having a cylindrical shape of the crushing body.

5. The vehicle body structure as claimed in claim 1, wherein the coupling strip has a coupling bead extending to have a ridged shape.

6. The vehicle body structure as claimed in claim 5, wherein
    the crushing body has a cylindrical shape being open along the vehicle front-rear direction, and has a crushing bead protruding in a cylindrical wall, and
    the coupling bead is arranged side by side in the vehicle width direction with the crushing bead.

7. The vehicle body structure as claimed in claim 2, wherein the fixing plate has an access hole communicating with an inside having a cylindrical shape of the crushing body.

8. The vehicle body structure as claimed in claim 2, wherein the coupling strip has a coupling bead extending to have a ridged shape.

9. The vehicle body structure as claimed in claim 8, wherein
    the crushing body has a cylindrical shape being open along the vehicle front-rear direction, and has a crushing bead protruding in a cylindrical wall, and
    the coupling bead is arranged side by side in the vehicle width direction with the crushing bead.

* * * * *